United States Patent [19]
Altenpohl, III

[11] Patent Number: 6,017,269
[45] Date of Patent: Jan. 25, 2000

[54] CARRIER AND CONVEYOR SYSTEM FOR HOLDING AND TRANSPORTING POULTRY AND THE LIKE

[76] Inventor: William F. Altenpohl, III, 1520 Wickliff Ave., High Point, N.C. 27262

[21] Appl. No.: 08/785,291

[22] Filed: Jan. 21, 1997

[51] Int. Cl.[7] .................................................. A22C 21/00
[52] U.S. Cl. ............................................................ 452/188
[58] Field of Search ..................................... 452/188, 187

[56] References Cited

U.S. PATENT DOCUMENTS

| | | |
|---|---|---|
| 233,698 | 10/1880 | Rankin . |
| 3,038,752 | 6/1962 | Bergman ................................... 294/19 |
| 3,051,096 | 8/1962 | Walsh et al. ............................. 104/167 |
| 3,166,785 | 1/1965 | Lemmond ................................. 17/44.1 |
| 3,563,363 | 2/1971 | Harben .................................... 452/188 |
| 3,615,003 | 10/1971 | Rust ..................................... 198/177 R |
| 4,317,258 | 3/1982 | Altenpohl et al. ........................... 17/24 |
| 4,351,087 | 9/1982 | Altenpohl et al. ........................ 17/44.1 |
| 4,413,376 | 11/1983 | Linville .................................. 17/44.1 |
| 4,627,007 | 12/1986 | Muschany ............................... 452/157 |
| 4,689,855 | 9/1987 | Dameron .................................. 17/11 |
| 4,838,036 | 6/1989 | Norrie .................................. 198/465.4 |
| 5,085,612 | 2/1992 | Muller et al. ............................. 452/51 |
| 5,092,815 | 3/1992 | Polkinghorne .......................... 452/179 |
| 5,340,351 | 8/1994 | Minderman et al. .................... 452/182 |
| 5,366,406 | 11/1994 | Hubbel et al. .......................... 452/179 |
| 5,487,700 | 1/1996 | Oillard ................................... 452/188 |
| 5,505,657 | 4/1996 | Janssen et al. .......................... 452/179 |

Primary Examiner—Willis Little
Attorney, Agent, or Firm—Myers Bigel Sibley & Sajovec

[57] ABSTRACT

The present invention is directed to a carrier for holding and transporting a product along a conveyor. The carrier includes a block having a lower surface and a footprint defined by a width and a length. A shackle has an upper end proximate the block and a lower end distal from the block. The upper end is secured to the block such that the shackle depends from the lower surface and the lower end of the shackle is prevented from moving toward the block. A holder is formed on the lower end of the shackle, the holder adapted to hold the product. The present invention is also directed to a transport/holder assembly for holding and transporting a product along a conveyor. The assembly includes a trolley engaging the conveyor for movement therealong. An adapter is secured to the trolley. A carrier is mounted on the adapter and depends therefrom. The carrier and the adapter are relatively arranged and configured such that the carrier may be vertically displaced with respect to the adapter and the trolley. The carrier may be constructed as described above. Preferably, the carrier is mounted on the trolley using an adapter according to the present invention. The present invention is further directed to a conveyor system incorporating a transport/holder assembly and methods for weighing and cutting a product.

53 Claims, 8 Drawing Sheets

CARRIER AND CONVEYOR SYSTEM FOR HOLDING AND TRANSPORTING POULTRY AND THE LIKE

FIELD OF THE INVENTION

The present invention is directed to means and methods for conveying and processing products such as poultry carcasses and the like, and, more particularly, to a carrier including a block and a transport/holder assembly and a conveyor system including such a carrier.

BACKGROUND OF THE INVENTION

In modern poultry processing methods and facilities, a given bird is subjected to numerous sequential operations. Typically, the bird is passed through a slaughtering line where it is bled and plucked to produce a raw carcass. Thereafter the carcass is passed through an evisceration room where the giblets are removed. The eviscerated carcass is placed in a chiller and thereafter hung on a drip line or sizing line. The sizing line typically includes an overhead conveyor having a series of trolleys mounted thereon. The trolleys each have a shackle depending therefrom. The birds are removably mounted on the shackles by inserting the legs into the shackles.

Usually, some form of cutting or further processing will add more value to a given poultry carcass than if the carcass were sold as a whole. In order to realize more value from the birds, after the birds have been placed on the sizing line and quality graded, they are sorted by weight and grade and are distributed into various processing steps including cutting, deboning, and solution injections. This type of processing can be very labor intensive. As discussed below, the overall profitability of the process is a function of the yield gained from each pound of processed meat which, in turn, is directly related to accurately matching bird weight with the operations to be performed.

Birds taken from the chiller are hung on a sizing line where they are weighed and sorted by weight and quality grade. The largest birds are typically sent to cut-up departments in order to maximize the total weight processed in these operations (i.e., to maximize yield). Today, these birds are dropped off of the sizing line and must be re-hung onto another line or cut-up machine. Special sizes selected by weight for fast food restaurant operations are usually processed on automatic machines that are set up for specific weight ranges of products. The remaining birds are sent to other operations.

Total plant yield is becoming an increasingly critical measurement for processing plants due to higher production costs and decreased margins. Each flock of birds being processed has birds of different weights throughout a range, and different flocks have different weight distributions. Some plants cannot justify the additional labor that is required to hang all of the birds exiting the chiller onto the sizing line, where they can be sorted by weight and grade. In these operations, birds are hung directly on the cut-up line in sufficient quantity to keep each cut-up shackle full, and hence to maximize the throughput of the department. Since there is no method available today to weigh on these cut-up lines, the total weight of products sent to the cut-up department remains "unknown" and total plant yield cannot be calculated.

Most of today's cut-up lines are automated lines. Birds are hung on shackles with both legs in order to orient the breast in the same direction. Although there are several types of cut-up machines, one of the most popular type splits off the breast and leaves the leg quarters riding in the shackle to pass into another machine. The breasts (front halves) are manually inserted into one of several special machines designed to separate the valuable meat from the bone. This deboning process can be optimized when the weight of each bird is accurately determined. The blades of the machines can be adjusted more accurately and the overall yield of the operation can be substantially improved.

In more sophisticated plants, in fast food plants, for example, each bird is hung on a shackle of a sizing line and each shackle (and thus the bird mounted on the shackle) is tracked by computer. The shackle with the bird thereon is weighed along the conveyor to determine the weight of the bird. Based on the weight of the bird, the preprogrammed computer determines the appropriate use for the bird. For example, birds in a given weight range may be targeted for sale to fast food restaurant A, birds in a second weight range may be targeted for sale to fast food restaurant B, and birds outside of these weight ranges may be targeted for ice packing. The computer controls drops along the conveyor so that the birds falling within a prescribed weight range are dropped at the stations at which they are to be processed.

It is very important that the birds be accurately weighed. Birds processed and sold to fast food restaurants and the like are sold at a premium. However, only birds which clearly fall within the prescribed weight ranges are acceptable. Birds which do not fall within the desired weight ranges may be suitable only for ice packing or the like, in which case they demand only a relatively low price. Accordingly, it is important that all birds which fall within the prescribed premium ranges are identified so that they are not inadvertently directed to the less profitable ice packing process. Because assurance must be provided that birds directed to the premium processes are in fact of appropriate weight, margins of error are observed in identifying the weights of birds so that any inaccuracy in weighing does not result in an overweight or underweight bird being sent to a premium process. If a suitable bird falls within the margin of error, it will be directed to a less profitable use than it could properly be used for. Similarly, if a bird of appropriate weight is inaccurately weighed and identified as out of the premium weight range, it will be directed to the less profitable use nonetheless. Thus, increasing the accuracy of weighing the birds is key to optimizing the usage of the birds and maximizing the profitability of the operation.

As a practical matter, the accuracy of weighing the birds decreases substantially linearly with increase in the speed of the sizing line. Unless the line is slowed from its maximum rate, wide margins of error must be observed, resulting in substantial waste of premium weight birds. In particular, the faster the line is run, the more the birds tend to swing, oscillate, wobble and bump adjacent birds, substantially decreasing the ability of the scale to accurately weigh the birds. Wear, friction, and damage to the conveyor and the shackles also decrease accuracy.

Another problem commonly experienced in poultry processing plants is difficulty in positioning and holding the suspended bird for cutting operations. Conventional shackles and trolleys typically allow the shackle to which the bird is mounted to swing in one or more vertical planes. Therefore, sizing shackles are not and cannot be used for cut-up operations.

Thus, there exists a need for a means and a method for increasing the accuracy with which birds suspended from a conveyor may be weighed. Moreover, there exists a need for a means and method for stabilizing a bird on a cut up line to provide more cost effective, accurate and efficient cutting of the bird. There exists a need for a means and method which provides for both accurate weighing and cutting at high speeds without requiring that the bird be transferred from one holding device to another holding device.

SUMMARY OF THE INVENTION

The present invention is directed to a carrier for holding and transporting a product along a conveyor. The carrier includes a block which has a lower surface and a footprint defined by a width and a length. The carrier further includes a shackle having an upper end proximate the block and a lower end distal from the block. The upper end is secured to the block such that the shackle depends from the lower surface and the lower end of the shackle is prevented from moving toward the block. A holder adapted to hold the product is formed on the lower end of the shackle.

Preferably, the width of the block is at least 20% of a distance from the lower surface of the block to the lower end of the shackle. The width of the block is preferably from about 3 inches to 6 inches. The length of the block is preferably at least 20% of a distance from the lower surface of the block to the lower end of the shackle. Further, the length of the block is preferably from about 3.5 inches to 6.5 inches.

The shackle may be secured to the block by a connecting shank. The shackle may be rotatable about a vertical axis. A portion of the bottom surface of the block adjacent a leading edge of the block may slope upwardly in the direction of the leading edge.

In a preferred embodiment, the block includes at least two spaced apart, interconnected sub-blocks. A central block may be mounted between the sub-blocks with the shackle secured to the block by a connecting shank having an upper end secured to the central block. Preferably, the sub-blocks are interconnected by at least one substantially horizontally disposed pin.

Alternatively, the block may be unitary.

Preferably, the block is formed from plastic material.

A plurality of spaced apart wheels may be rotatably mounted on the block. Further, an electronically readable identification tag may be disposed on the block.

The present invention is further directed to an adapter for connecting a carrier and a trolley, the carrier of the type having at least two substantially horizontally disposed pins, the pins spaced apart a prescribed distance. The adapter includes an upper, base plate and a lower plate integral with the base plate. The base plate is adapted to rigidly engage the trolley. The lower plate has a lead slot and a trailing slot formed therein. The lead and trailing slots are spaced apart from one another a prescribed distance corresponding to the distance between the pins. Each of the lead and trailing slots is sized and configured to allow vertical movement of the pins relative to the slots when the pins are disposed in respective ones of the lead and trailing slots.

Preferably, the lead and trailing slots are each sized and configured to allow sideward movement of the pins relative to the slots when the pins are disposed in respective ones of the lead and trailing slots. Further, the lead slot may have a rear edge and the trailing slot may have a rear edge. The respective rear edges are spaced apart a distance greater than the distance between the pins. Further, at least one of the lead slot and the trailing slot may include a lower recess sized and configured to receive a respective one of the pins and to prevent sideward movement of the respective pin.

The adapter may include at least two transverse bores formed in the base plate for selectively receiving a bolt for securing the adapter to the trolley.

The present invention is further directed to a transport/holder assembly for holding and transporting a product along a conveyor. The assembly includes a trolley engaging the conveyor for movement therealong. An adapter is secured to the trolley. A carrier is mounted on the adapter and depends therefrom. The carrier and the adapter are relatively arranged and configured such that the carrier may be vertically displaced with respect to the adapter and the trolley.

In a preferred embodiment of the transport/holder assembly, the carrier has at least two spaced apart, substantially horizontally disposed pins, and the adapter is formed as described above. Alternatively, the adapter may be integrally formed with the trolley. Further, in preferred embodiments, the carrier of the transport/holder assembly may be formed as described above.

The present invention is further directed to a conveyor system for holding and transporting a product to workstations. The conveyor system includes a conveyor and a transport/holder assembly mounted on the conveyor for transport along a path. The transport/holder assembly includes a trolley engaging the conveyor for movement therealong. An adapter is secured to the trolley. A carrier is mounted on the adapter and depends therefrom. The carrier and the adapter are relatively arranged and configured such that the carrier may be vertically displaced with respect to the adapter and the trolley.

In preferred embodiments of the conveyor system, the carrier is formed as described above.

The conveyor system may include a weigh station disposed along the conveyor in the path of the transport/holder assembly. The weigh station has a platform and is operative to measure weight on the platform. The platform, the conveyor, the trolley and the carrier are relatively arranged and configured such that the carrier is raised with respect to the adapter as the carrier passes over the platform. The weigh station may include at least one stabilizer rail operative to limit movement of the carrier transverse to the path of the transport/holder assembly.

The conveyor system may include a cutting station disposed along the conveyor in the path of the transport/holder assembly. The cutting station includes at least one of an upper guide rail and a lower guide rail operative to limit vertical displacement of the carrier. Preferably, the conveyor system includes both of the upper and lower guide rails.

Further, the present invention is directed to a method for processing a product. The product is mounted in a carrier. The carrier and the product are conveyed through a weigh station and over a weighing platform forming a part of the weigh station while the carrier is free to move vertically through a prescribed range.

The method may further include the step of conveying the carrier and the product through a cutting station including at least one of an upper guide rail and a lower guide rail. The at least one guide rail is operative to limit vertical displacement of the carrier and the product so that the product is held stationary for cutting.

The preceding and objects of the present invention will be appreciated by those of ordinary skill in the art from a reading of the Figures and the detailed description of the preferred embodiment which follow, such description being merely illustrative of the present invention.

DETAILED DESCRIPTION OF THE PREFERRED EMBODIMENT

Figure 1:
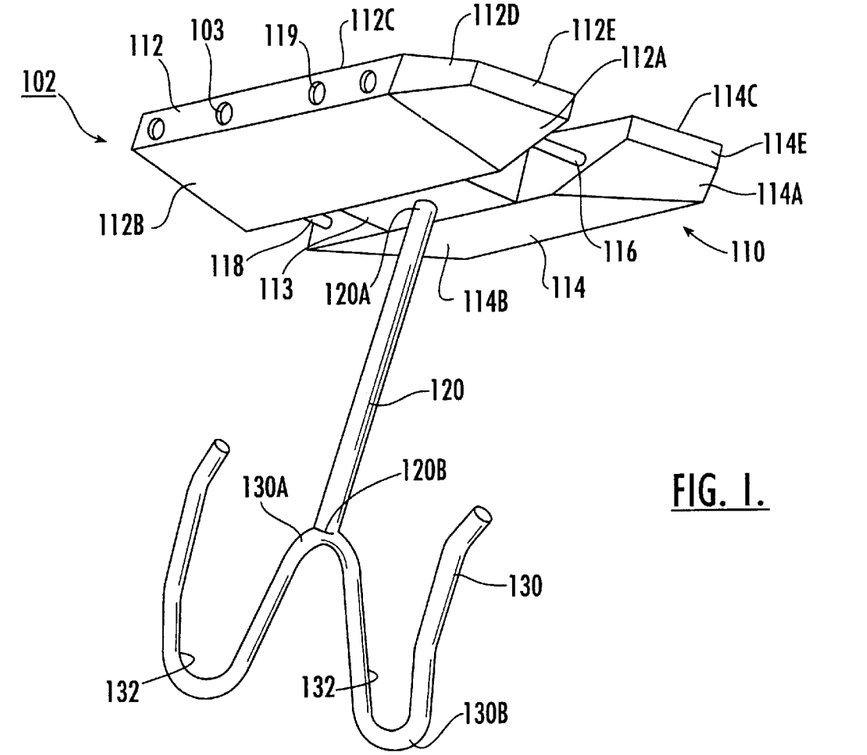
FIG. 1 is a perspective view of a carrier according to the present invention.

A device in motion must have freedom of motion vertically for accurate weighing to take place. However, a device in motion should be as rigid as possible for accurate and efficient cutting of conveyed products. It will be appreciated that while these two requirements are at odds, it is inefficient to place a given bird on a first type of conveying device for weighing and then remove the bird from that device and remount it on a second device for cutting. The present invention includes a carrier 102 as shown in FIG. 1 which provides for increased weighing accuracy as well as increased cutting efficiency without requiring removal and replacement of a bird. In particular, with reference to FIG. 3, the foregoing objectives are accomplished by the provision of block 110 used in conjunction with adapter 150 and trolley 170, which together form transport/holder assembly 100. Assembly 100 is pulled along rail 20 by chain 22 as discussed in more detail below. RF tag, bar code, or other identification means 103 may be provided on the carrier or the adapter by which a computer controller (discussed below) with appropriate sensors may identify and track each bird.

Figure 2:
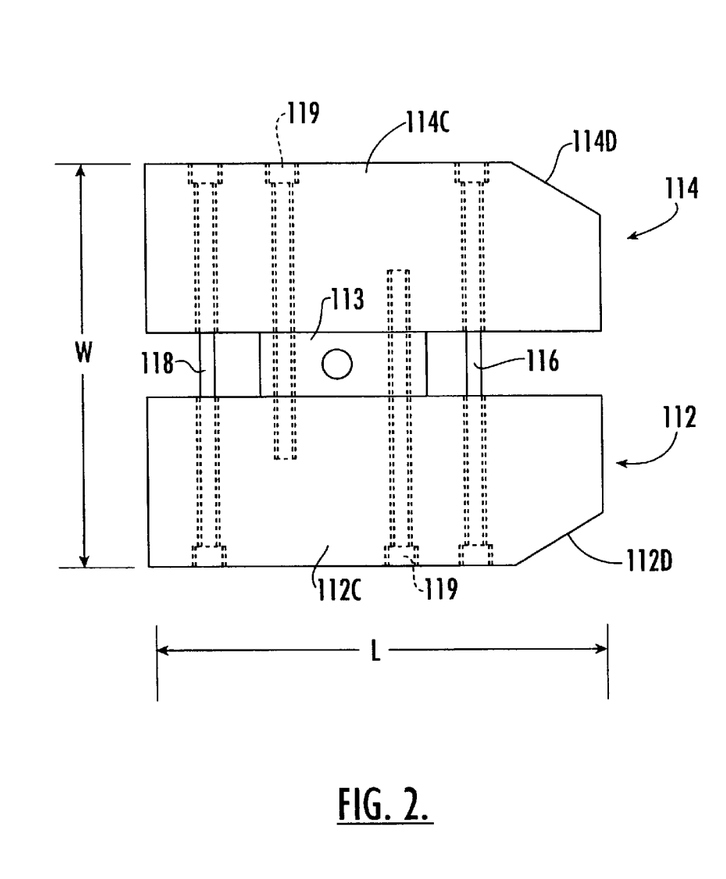
FIG. 2 is a top plan view of the carrier.

With reference to FIGS. 1 and 2, carrier 102 includes block 110, shackle 130, and shank 120 connecting block 110 and shackle 130. Block 110 includes sub-block 112 and sub-block 114 which are spaced apart and joined by transverse bolts or pins 116 and 118. Each of the sub-blocks has an upwardly sloped lower surface 112A, 114A, an upwardly sloped lower surface 112B, 114B, a top surface 112C, 114C, an inwardly sloped side surface 112D, 114D and a leading edge 112E, 114E. Lower surfaces 112B, 114B are preferably sloped at about 5 to 15 degrees and, more preferably, at about 8 to 10 degrees. Central block 113 is secured between sub-blocks 112, 114 by bolts 119 which extend through the central block. Upper end 120A of shank 120 is rigidly secured to central block 113 by any suitable means, for example, a bolt or welding. Each bolt 116, 118 has a portion extending across the gap between sub-blocks 112 and 114 and on either side of central block 113. Upper end 130A of shackle 130 is rigidly mounted to lower end 120B of shank 120. Lower end 130B of shackle 130 has leg slots 132 formed therein to receive a pair of poultry legs. Leg slots 132 may be of any suitable configuration including, for example, a single or double leg cut up hook, a single or double leg push-off type hook, or a single or double leg releasing hook.

Upper end 120A of shank 120 may be rigidly formed with or secured to central block 113 so that shank 120 is not movable with respect to block 110. Alternatively, shank 120 may be rotatably mounted to central block 113 so that shackle 130 is rotatable about a vertical axis. In either case, shank 120 and shackle 130 should not be vertically pivotable.

Figure 3:
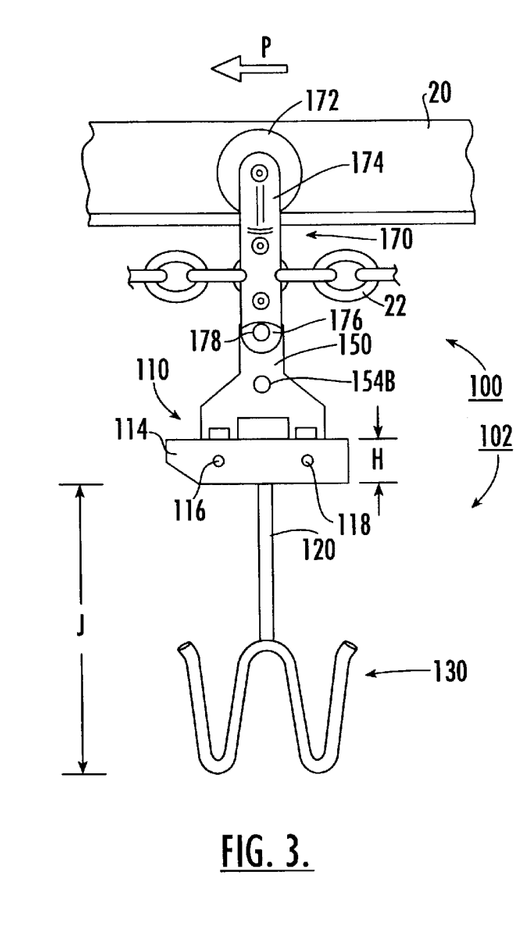
FIG. 3 is a side elevational view of a transport/holder assembly according to the present invention incorporating the carrier and mounted on a conveyor.

With reference to FIG. 2, block 110 of carrier 102 has a footprint defined by length L and width W. With reference to FIG. 3, block 110 also has height H. Dimension J is defined from lower surfaces 112B, 114B of block 110 to lower end 130B of the shackle. Width W is preferably from about 3 inches to 6 inches. Length L is preferably from about 3.5 inches to 6.5 inches. Height H is preferably from about 0.75 inch to 1.5 inches. Length J (see FIG. 3), i.e., the distance from the lower surfaces 112A, 114A of the sub-blocks to lower end 130B of shackle 130, is preferably from about 6 inches to 10 inches. In any event, width W is at least twenty percent (20%) of length J, and length L is at least twenty percent (20%) of length J. Sub-blocks 112, 114 are preferably formed from plastic, and in particular, nylon. Pins 116, 118 are spaced from about 3 inches to 5 inches apart. Sub-blocks 112, 114 are spaced apart from about 0.5 inch to 1 inch apart.

As best seen in FIG. 3, carrier 102 may be incorporated into transport/holder assembly 100 as shown. Assembly 100 is mounted on inverted T-shaped rail 20 and is drawn in direction P by means of chain 22. More particularly, trolley 170 has spaced apart, opposed rollers 172 rotatably mounted on body 174 and disposed on either side of rail 20. A link of chain 22 is secured within body 174 of the trolley. Trolley 170 has a pair of spaced apart, downwardly extending plates or tabs 176. Trolley 170 as thus far described may be of conventional construction, suitable trolley components being available from Greenline Conveyor, Inc. of Charlotte, N.C. Further, it will be appreciated by those of ordinary skill in the art that trolley 170 may be modified to travel along an I-shape rail, a pipe, or any other suitable conveyor support.

As best seen in FIGS. 3, 6, 7, and 9A–9D, adapter 150 includes a base plate, the upper end of which is positioned between plates 176 of the trolley. Bolt 178 extends through bores formed in plates 176 and either bore 154A, as shown, or bore 154B formed through adapter 150. The selection of the bore 154A or 154B through which bolt 178 is inserted will depend on the desired vertical position of the adapter and the configuration of the trolley. It will be appreciated that the provision of two or more bores through the adapter allows the use of a single adapter configuration to accommodate a variety of conventional trolley constructions and conveyor configurations.

Figure 9A:
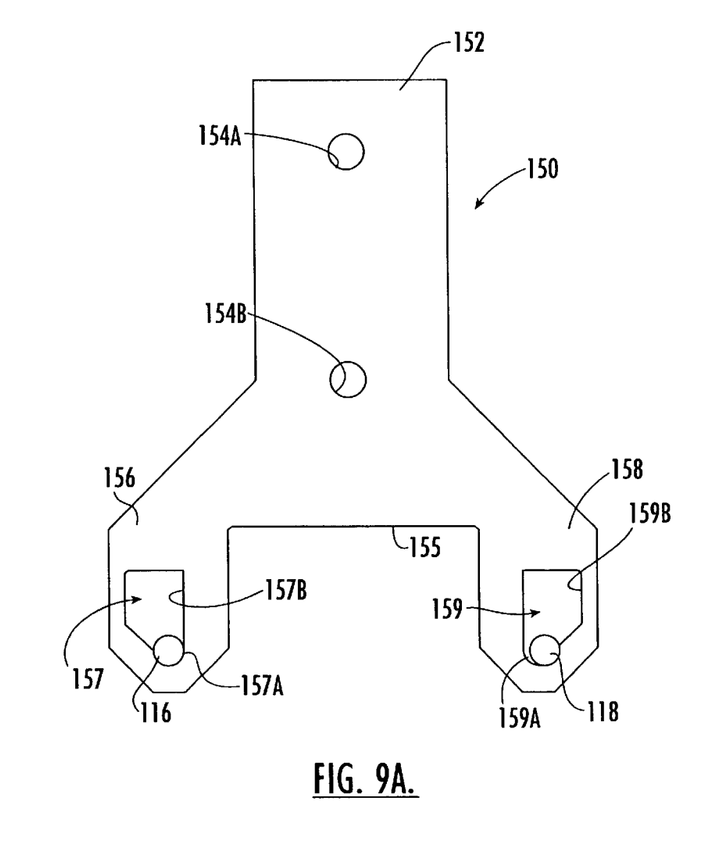
FIGS. 9A–9D are side elevational views of the adapter with the pins of the carrier shown schematically.
Figure 9B:
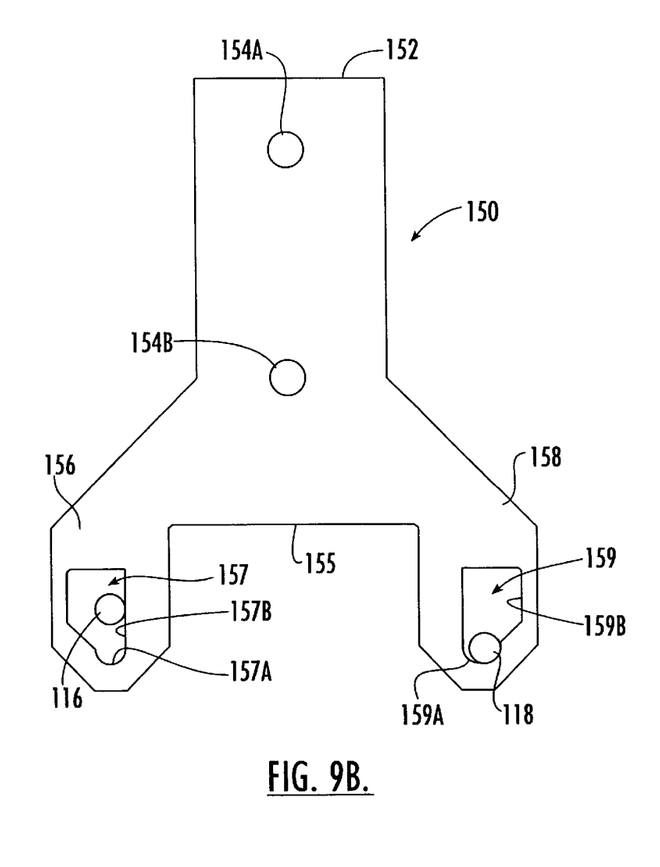

As best seen in FIGS. 9A–9B, adapter 150 has lead tab 156 and trailing tab 158 extending downwardly from base plate 152. Cut out 155 is defined between the tabs. Lead slot 157 having bottom recess 157A and rear edge 157B is formed in lead tab 156. Lead slot 157 is from about 0.5 inch to 1 inch wide and from about 0.5 inch to 1.5 inches long. Trailing slot 159 having bottom recess 159A and rear edge 159B is formed in trailing tab 158. Trailing slot 159 is from about 0.5 inch to 1 inch wide and from about 0.5 inch to 1.5 inches long. Carrier 102 is mounted on adapter 150 (and thus trolley 170) by positioning bolts or pins 116 and 118 in lead slot 157 and trailing slot 159, respectively. Rear edges 157B and 159B are spaced apart from one another from about 0.125 inch to 0.5 inch more than pins 116 and 118. The construction as described and shown allows for a prescribed range of vertical movement of carrier 102 with respect to adapter 150, as well as a prescribed range of lateral relative movement. Cut out 155 serves to receive central block 113 as pins 116 and 118 move up the respective slots 157 and 159.

Figure 4:
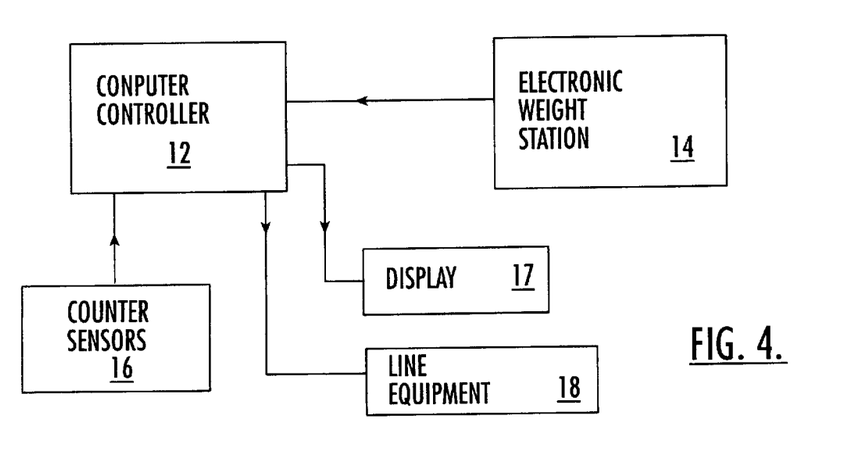
FIG. 4 is a schematic diagram of the computer control system of a conveyor system according to the present invention.

With reference to FIG. 4, a general schematic electrical diagram representing a conventional conveyor control system 10 is shown therein. In conventional manner, the positions of respective assemblies 100 sequentially mounted on rail 20 are tracked by means of a series of counter sensors 16, the signals of which are received by computer controller 12. Computer controller 12 also receives signals corresponding to weight measurements for each of the respective assemblies 100 from electronic weigh station 14. Based on the information received from electronic weigh station 14, computer controller 12 generates control signals to display 17 and various line equipment 18. Responsive to these signals, display 17 may indicate to a human operator that certain action should be taken, for example, an underweight bird should be removed from the line. Similarly, responsive to a signal from controller 12, various line equipment 18 will take appropriate action when a given assembly 100 arrives, for example, automatically dropping a bird of a prescribed weight from the assembly into a bin for further processing. As noted in the Background of the Invention, it is very important that each assembly 100 and bird be accurately weighed by weigh station 14 so that the birds may be appropriately categorized and manipulated by computer controller 12.

As noted in the Background of the Invention, swinging, oscillation, and bumping of the birds substantially reduces the accuracy of the weighing operation. On the other hand, it is necessary that the bird and shackle be substantially free to move vertically in order to achieve a meaningful measurement. Moreover, the weight of the conveyor structure weighed with the bird should be minimized so that the overall weight and hence the margin for error may be reduced.

With reference to FIGS. 5–8, the foregoing objectives are achieved by electronic weigh station 14 by the use of assemblies 100 incorporating carriers 102 and a weigh station as follows. In addition to the conveyor rail and chain (not shown in FIG. 5), weigh station 14 includes frame 50, stabilizer rail 58, and scale 40 connected to support plate 44 by yoke or saddle 42. Assemblies 100 are conveyed continuously in direction S. A weigh station sensor 16 senses the trolley and identifies the carrier being weighed. The sensor also tells the computer when the weight values, which are continually received from the scale, should be averaged to calculate the weight of the product.

Figure 5:
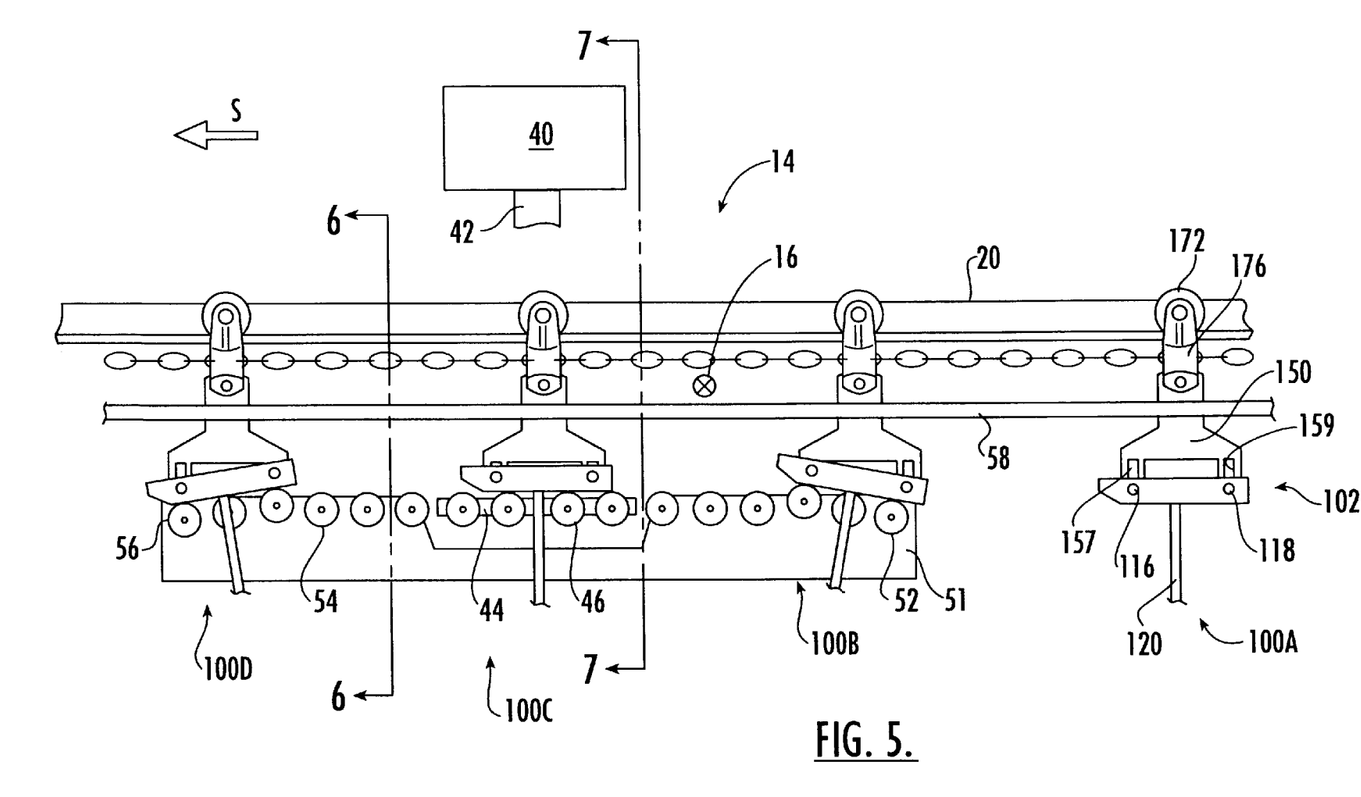
FIG. 5 is a side elevational, fragmentary view of a weigh station according to the present invention.

With reference to FIG. 5 and FIG. 9A, carrier 102 of assembly 100A is positioned in adapter 150 as shown prior to entry of the assembly into frame 50. Notably, pins 116 and 118 are positioned in recesses 157A and 159A, respectively, which substantially complement the shape of the pins. This serves to minimize swinging of shackle 130 along the direction of travel of assembly 100.

Assembly 100B is shown entering fixed track 51 of weigh station 14 which is stationarily mounted with respect to rail 20 and frame 50. As assembly 100B enters, block 110 ramps up rollers 52 and onto rollers 54. This transition is facilitated by sloped lower surfaces 112A, 114A. With reference to FIG. 9B, pins 116 and 118 assume the positions as shown therein relative to adapter 150. Thereafter, carrier 102 is supported by rollers 54 which engage lower surfaces 112B, 114B of block 110 and hold the block in a raised position with respect to adapter 150.

Figure 9C:
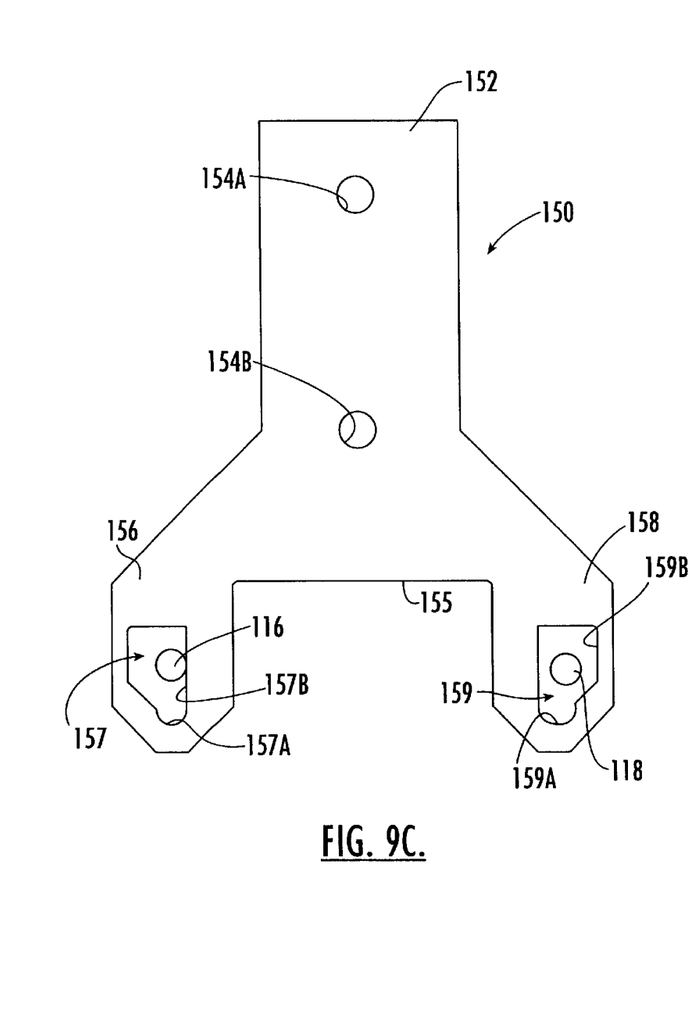

Assembly 100C is positioned on platform 44 and is supported by rollers 46 which engage lower surfaces 112B, 114B. The weight of carrier 102 and the bird hung on shackle 130 displace platform 44 downwardly in direction R, the degree of displacement being measured by scale 40. Scale 40 has sufficient preload that carrier 102 is maintained in a partially raised position with respect to adapter 150 so that pins 116 and 118 are positioned as shown in FIG. 9C. Because the distance between rear edges 157B, 159B of the lead and trailing slots is greater than the distance between pins 116, 118, carrier 102 is drawn across platform 44 only by the engagement of pin 116 with rear edge 157B of the lead slot, thereby minimizing any friction which may affect the accuracy of the weighing. The slopes of lower surfaces 112B, 114B and the complementary angles of wheels 46 help to center the carrier as it passes through the scale platform.

Figure 9D:
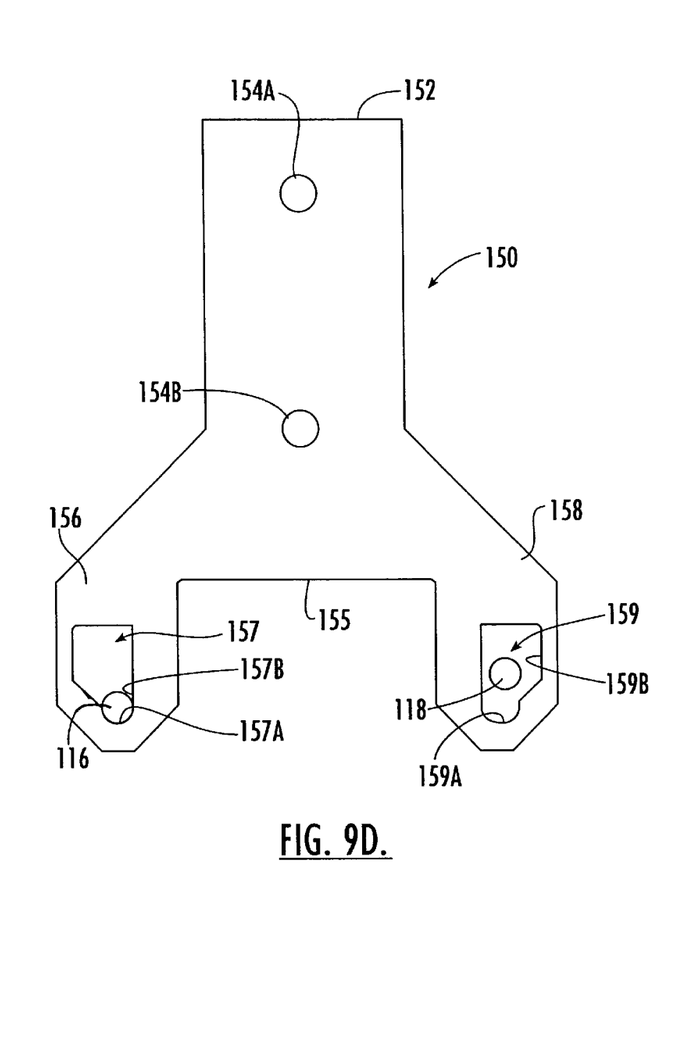

Following weighing, assembly 100D ramps down rollers 56 so that pins 116, 118 assume the position as shown in FIG. 9D.

It will be appreciated from the above description that because carrier 102 is free to move vertically within slots 157, 159 with minimal frictional contact between pin 116 and rear edge 157B, accuracy of the weighing is enhanced by the substantially free vertical movement of the carrier and the bird on platform 44. Moreover, because only carrier 102 is weighed with the bird, the mass weighed with the bird not attributable to the bird is minimized. For example, it is feasible to manufacture carriers as described with weight tolerances of no more than (+) or (−) 2 grams or better. As a result, by adjusting the weigh cell to have an appropriate pre-set tare value for the carrier weight, the net weight of the bird can be accurately calculated by subtracting the tare value from the gross weight.

Figure 6:
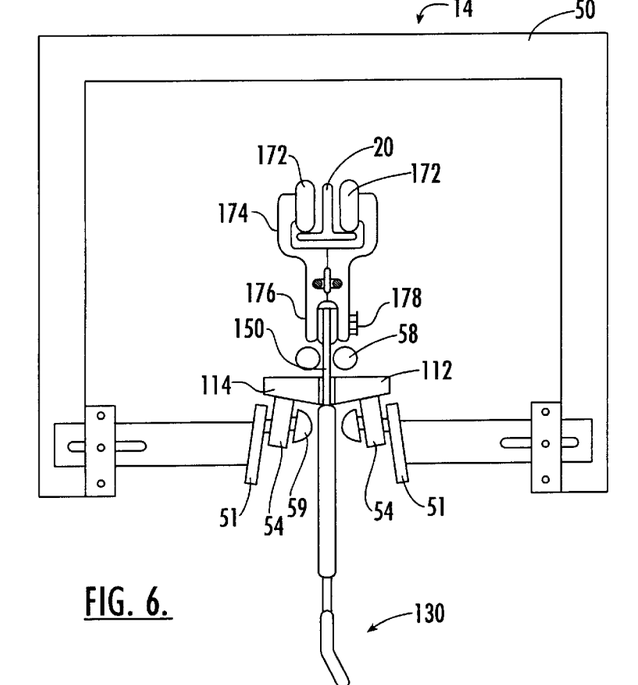
FIG. 6 is a cross-sectional, fragmentary view of the weigh station of FIG. 5 viewed along line 6—6.
Figure 7:
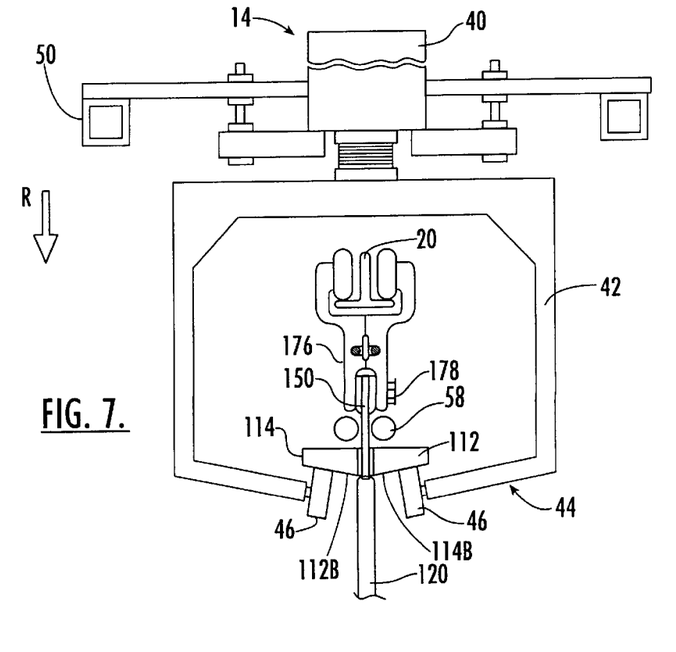
FIG. 7 is a cross-sectional, fragmentary view of the weigh station of FIG. 5 viewed along line 7—7.

Swinging, oscillation, and bumping of the birds at the point of weighing is reduced or eliminated by the following provisions. First, the combination of block 110's relatively wide and long footprint relative to the length of the shackle and the rigid (at least with respect to vertical) mounting of shackle 130 to block 110 substantially reduces the ability of the bird to move fore and aft or side to side. Secondly, as best seen in FIGS. 5 and 6, stabilizer rails 58 positioned on either side of and in close proximity to adapters 150 serve to minimize or eliminate any side to side movement of assemblies 100 which might otherwise be present due to the conventional design of trolleys 170. Similarly, carrier guide bars 59 (not shown in FIG. 5) are positioned on either side of shank 120, however, bars 59 are not positioned along platform 44.

Figure 8:
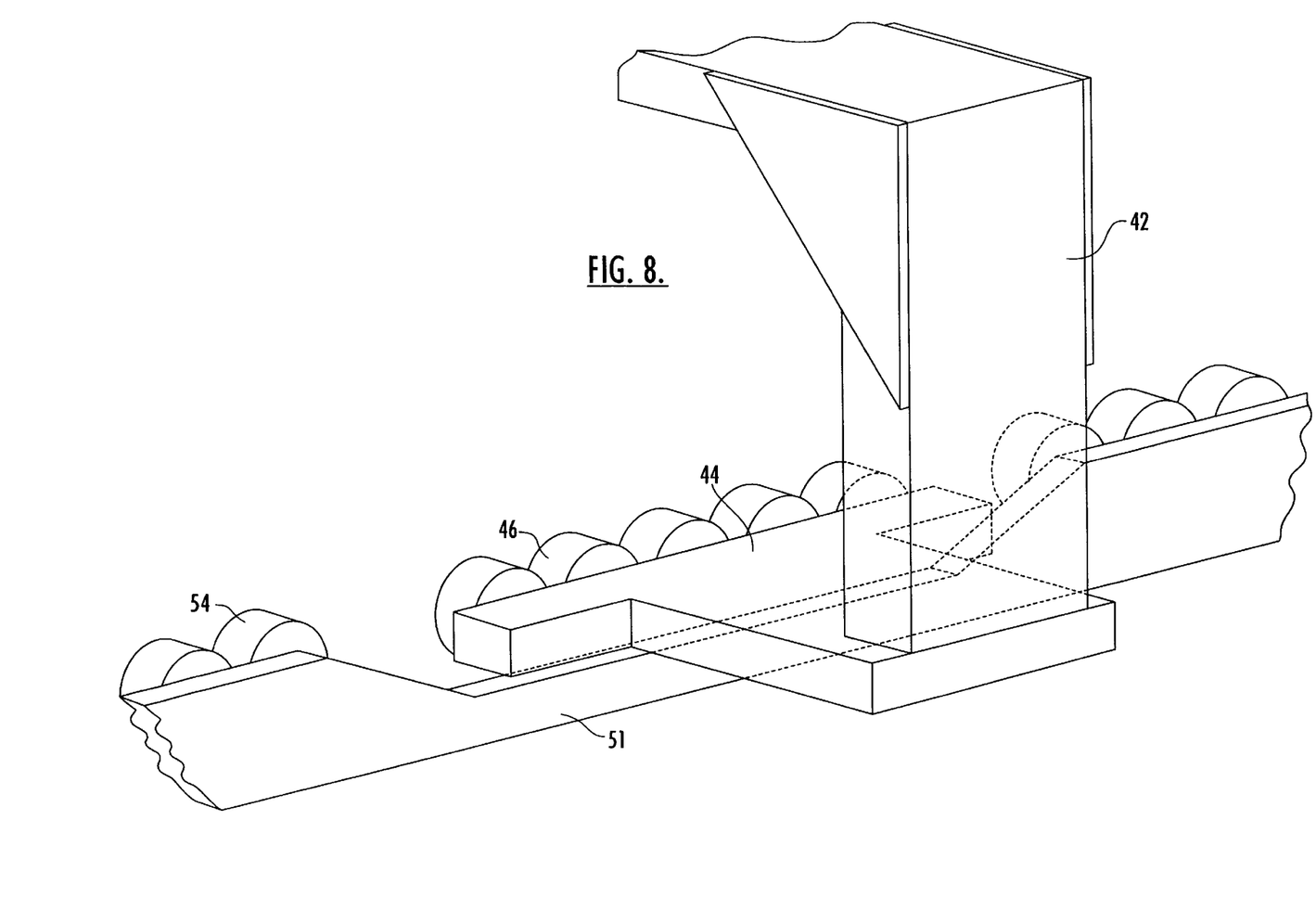
FIG. 8 is a fragmentary, perspective view showing the fixed track and the weighing yoke of the weighing station.

With reference to FIG. 8, a cutting station 16 making advantageous use of assembly 100 is shown therein. As noted above, it is important that the bird be accurately located during the cutting operation. This means that the bird should not be swinging, oscillating, or bumping with adjacent birds. Further, the bird should be held relatively rigidly so that it does not tend to move away from the blade as it is being cut.

Cutting station 16 has upper guide rails 60 (only the near side rail being visible in FIG. 10) rigidly mounted to the conveyor frame (not shown) on either side of adapter 150 and positioned closely adjacent upper surfaces 112C and 114C of block 110. Lower guide rails 62 (only the near side rail being visible in FIG. 10) are similarly rigidly mounted to the conveyor frame and are positioned closely adjacent lower surfaces 112B and 114B of block 110. As assembly 100 is conveyed in direction S, block 110 enters between upper guide rails 60 and lower guide rails 62. Block 110 is sandwiched between the upper and lower guide rails thereby reducing or eliminating any pivoting of block 110 with respect to vertical. As noted above, shank 120 is rigidly mounted to block 110 with respect to vertical, and shackle 130 is in turn rigidly mounted to shank 120. The nominal clearance between the upper surfaces of the block and the upper guide rails is preferably no more than 0.25 inch. The lower surface of the block preferably slides along or within thousandths of an inch above the lower guide rails.

Figure 10:
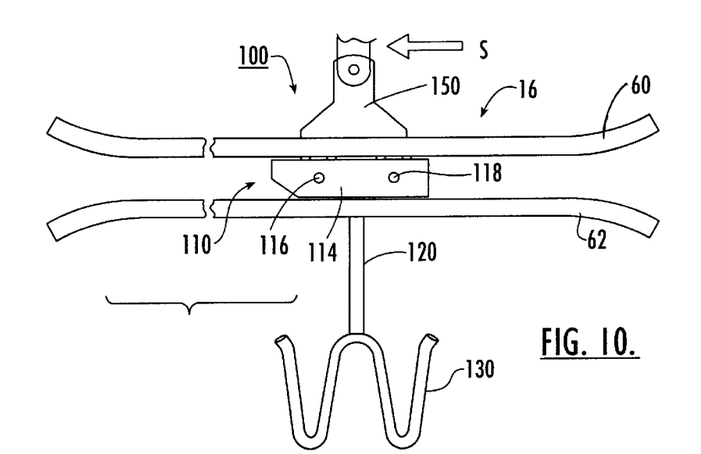
FIG. 10 is a side elevational, fragmentary view of the transport/holder assembly and a cutting station according to the present invention.

The lower guide rail may be eliminated if the upper guide rail is positioned to lie closely adjacent the upper surface of the block when the pins are positioned at the bottoms of slots 157 and 159. Alternatively, the upper guide rail may be eliminated if the lower guide rail is positioned to lie closely adjacent the lower surfaces of the block when the pins 116, 118 are positioned at the tops of slots 157 and 159.

Figure 11:
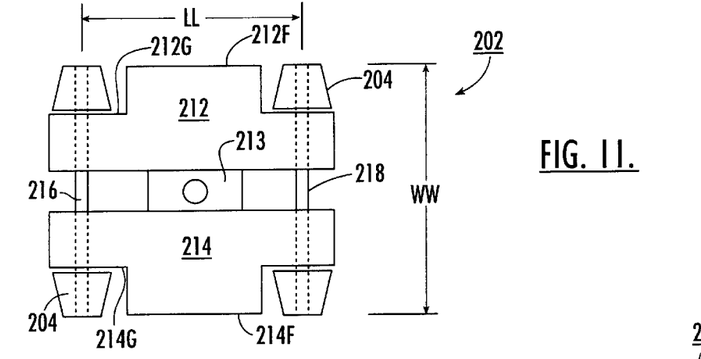
FIG. 11 is a top plan view of a carrier according to the present invention having wheels.
Figure 12:
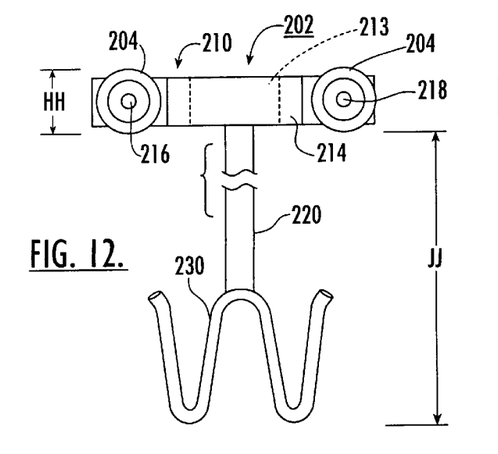
FIG. 12 is a fragmentary, side elevational view of the carrier of FIG. 11.
Figure 13:
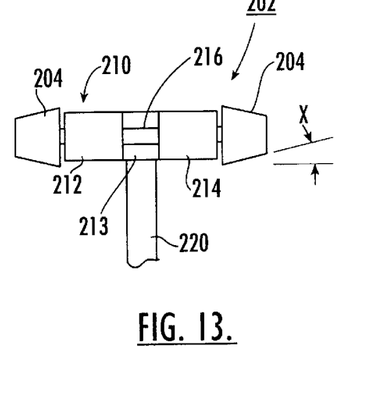
FIG. 13 is a fragmentary, front elevational view of the carrier of FIG. 11.

With reference to FIGS. 11–13, a carrier 202 according to a second embodiment is shown therein. Carrier 202 includes block 210. Block 210 includes sub-blocks 212 and 214 and central block 213. The upper end of shank 220 is secured to central block 213. Shackle 230 is secured to the lower end of shank 220. Pins 216 and 218 corresponding to pins 116 and 118, respectively, extend between sub-blocks 212 and 214 and either side of central block 213. Each of the aforedescribed components of carrier 202 are preferably formed of the same materials and with the same dimensions and relative spacings as the corresponding components of carrier 102 except as discussed below.

Sub-blocks 212 and 214 each have cut-outs 212G and 214G, respectively, to receive wheels 204. Wheels 204 are rotatably mounted on the ends of pins 216 and 218. As shown, the outer edges of wheels 204 preferably align with the side edges 212F and 214F of the sub-blocks. Wheels 204 have a height HH of from about 1.0 to 1.5 inches. Block 210 has a footprint defined by width WW and length LL. Preferably, dimensions WW and LL (i.e., from axle to axle of wheels 204) are the same as described above for dimensions W and L, respectively, of block 110. As in the first embodiment, each of width WW and length LL are at least 20% of length JJ which is the vertical distance from the lower most portions of wheels 204 to the lower end of shackle 230. The peripheries of wheels 204 are preferably sloped at an angle X (see FIG. 13) of from about 8 to 10 degrees.

It will be appreciated that carrier 202 may be used with adapter 150 as well. By placing wheels 204 as far out into the corners of the carrier footprint as possible, carrier 202 serves to resist wobbling or pivoting of shackle 230 in the same manner as described for carrier 102. The sloping of wheels 204 helps to center the carrier as it passes through the scale platform. The upper and lower flat surfaces of sub-blocks 212, 214 allow for cooperative use of the carrier with guide and stabilizer bars as described above. Where wheeled carriers 202 are used in place of carriers 102, the platform of the scale should be a flat bar, rather than having wheels 46.

While a preferred embodiment of the present invention has been described, it will be appreciated by those of skill in the art that certain modifications may be made without departing from the scope of the present invention. For example, leg slot 132 may be replaced with a parts or portion transport basket or the like. Sub-blocks 112, 114 and even central block 113 may be formed of a single piece of plastic or other suitable material. The adapter may be integrally formed with the trolley. All such modifications are intended to come within the scope of claims which follow.

What is claimed is:

1. A carrier for holding and transporting a product along a conveyor, said carrier comprising:
   a) a block having a lower surface and a footprint defined by a width and a length;
   b) a shackle having an upper end proximate said block and a lower end distal from said block, said upper end secured to said block such that said shackle depends from said lower surface and said lower end of said shackle is prevented from moving toward said block; and
   c) a holder formed on said lower end of said shackle, said holder adapted to hold the product;
   d) wherein said shackle is secured to said block by a connecting shank, said connecting shank rotatable engaging said block whereby said shackle is rotatable relative to said block about a substantially vertical axis.

2. The carrier of claim 1 wherein said width of said block is at least 20% of a distance from said lower surface of said block to said lower end of said shackle.

3. The carrier of claim 1 wherein said width of said block is from about 3 inches to 6 inches.

4. The carrier of claim 1 wherein said length of said block is at least 20% of a distance from said lower surface of said block to said lower end of said shackle.

5. The carrier of claim 1 wherein said length of said block is from about 3.5 inches to 6.5 inches.

6. The carrier of claim 1 wherein said block is formed from plastic material.

7. The carrier of claim 1 wherein said block is unitary.

8. A carrier for holding and transporting a product along a conveyor, said carrier comprising:
   a) a block having a lower surface and a footprint defined by a width and a length;
   b) a shackle having an upper end proximate said block and a lower end distal from said block, said upper end secured to said block such that said shackle depends from said lower surface and said lower end of said shackle is prevented from moving toward said block; and
   c) a holder formed on said lower end of said shackle, said holder adapted to hold the product;
   d) wherein said block has a leading edge and a portion of said bottom surface adjacent said leading edge slopes upwardly in the direction of said leading edge.

9. A carrier for holding and transporting a product along a conveyor, said carrier comprising:
   a) a block having a lower surface and a footprint defined by a width and a length;
   b) a shackle having an upper end proximate said block and a lower end distal from said block, said upper end secured to said block such that said shackle depends from said lower surface and said lower end of said shackle is prevented from moving toward said block; and
   c) a holder formed on said lower end of said shackle, said holder adapted to hold the product;

d) wherein said block includes at least two spaced apart, interconnected sub-blocks.

10. The carrier of claim 9 including a central block mounted between said sub-blocks and wherein said shackle is secured to said block by a connecting shank having an upper end secured to said central block.

11. The carrier of claim 9 wherein said sub-blocks are interconnected by at least one substantially horizontally disposed pin.

12. A carrier for holding and transporting a product along a conveyor, said carrier comprising:
   a) a block having a lower surface and a footprint defined by a width and a length;
   b) a shackle having an upper end proximate said block and a lower end distal from said block, said upper end secured to said block such that said shackle depends from said lower surface and said lower end of said shackle is prevented from moving toward said block;
   c) a holder formed on said lower end of said shackle, said holder adapted to hold the product; and
   d) a plurality of spaced apart wheels rotatably mounted on said block.

13. A carrier for holding and transporting a product along a conveyor, said carrier comprising:
   a) a block having a lower surface and a footprint defined by a width and a length;
   b) a shackle having an upper end proximate said block and a lower end distal from said block, said upper end secured to said block such that said shackle depends from said lower surface and said lower end of said shackle is prevented from moving toward said block;
   c) a holder formed on said lower end of said shackle, said holder adapted to hold the product; and
   d) an electronically readable identification tag disposed on said block.

14. An adapter for connecting a carrier and a trolley, the carrier of the type having at least two substantially horizontally disposed pins, the pins spaced apart a prescribed distance, said adapter comprising:
   a) an upper, base plate adapted to rigidly engage the trolley; and
   b) a lower plate integral with said base plate and having a lead slot and a trailing slot formed therein, said lead and trailing slots spaced apart from one another a prescribed distance corresponding to the distance between the pins, each of said lead and trailing slots sized and configured to allow vertical movement of the pins relative to the slots when the pins are disposed in respective ones of said lead and trailing slots.

15. The adapter of claim 14 wherein said lead and trailing slots are each sized and configured to allow sideward movement of the pins relative to the slots when the pins are disposed in respective ones of said lead and trailing slots.

16. The adapter of claim 15 wherein said lead slot has a rear edge and said trailing slot has a rear edge, said respective rear edges spaced apart a distance greater than the distance between the pins.

17. The adapter of claim 15 wherein at least one of said lead slot and said trailing slot includes a lower recess sized and configured to receive a respective one of the pins and to prevent sideward movement of said respective pin.

18. The adapter of claim 14 including at least two transverse bores formed in said base plate for selectively receiving a bolt for securing said adapter to the trolley.

19. A transport/holder assembly for holding and transporting a product along a conveyor, said assembly comprising:
   a) a trolley engaging the conveyor for movement therealong;
   b) an adapter secured to said trolley;
   c) a carrier mounted on said adapter and depending therefrom, wherein said carrier and said adapter are relatively arranged and configured such that said carrier may be vertically displaced with respect to said adapter and said trolley; and
   d) wherein said carrier has at least two substantially horizontally disposed pins, said pins spaced apart a prescribed distance, and wherein said adapter comprises:
      an upper, base plate adapted to rigidly engage said trolley; and
      a lower plate integral with said base plate and having a lead slot and a trailing slot formed therein, said lead and trailing slots spaced apart from one another a prescribed distance corresponding to said distance between said pins, each of said lead and trailing slots sized and configured to allow vertical movement of said pins relative to the slots when said pins are disposed in respective ones of said lead and trailing slots.

20. The assembly of claim 19 wherein said lead and trailing slots are each sized and configured to allow sideward movement of said pins relative to said slots when said pins are disposed in respective ones of said lead and trailing slots.

21. The assembly of claim 20 wherein said lead slot has a rear edge and said trailing slot has a rear edge, said respective rear edges spaced apart a distance greater than said distance between said pins.

22. The assembly of claim 20 wherein at least one of said lead slot and said trailing slot includes a lower recess sized and configured to receive a respective one of said pins and to prevent sideward movement of said respective pin.

23. The assembly of claim 19 wherein said adapter has at least two transverse bores formed in said base plate, said adapter secured to said trolley by a bolt extending through at least one of said bores.

24. The assembly of claim 19 wherein said adapter is integrally formed with said trolley.

25. A transport/holder assembly for holding and transporting a product along a conveyor, said assembly comprising:
   a) a trolley engaging the conveyor for movement therealong;
   b) an adapter secured to said trolley;
   c) a carrier mounted on said adapter and depending therefrom, wherein said carrier and said adapter are relatively arranged and configured such that said carrier may be vertically displaced with respect to said adapter and said trolley; and
   d) wherein said carrier includes:
      a block having a lower surface and a footprint defined by a width and a length;
      a shackle having an upper end proximate said block and a lower end distal from said block, said upper end secured to said block such that said shackle depends from said lower surface and said lower end of said shackle is prevented from moving toward said block; and
      a holder formed on said lower end of said shackle, said holder adapted to hold the product.

26. The assembly of claim 25 wherein said width of said block is at least 20% of a distance from said lower surface of said block to said lower end of said shackle.

27. The assembly of claim 25 wherein said width of said block is from about 3 inches to 6 inches.

28. The assembly of claim 25 wherein said length of said block is at least 20% of a distance from said lower surface of said block to said lower end of said shackle.

29. The assembly of claim 25 wherein said length of said block is from about 3.5 inches to 6.5 inches.

30. The assembly of claim 25 wherein said upper end of said shackle is secured to said block by a connecting shank.

31. The assembly of claim 25 wherein said shackle is rotatable about a vertical axis.

32. The assembly of claim 25 wherein said block has a leading edge and a portion of said bottom surface adjacent said leading edge slopes upwardly in the direction of said leading edge.

33. The assembly of claim 25 wherein said block includes at least two spaced apart, interconnected sub-blocks.

34. The assembly of claim 33 wherein said carrier includes a central block mounted between said sub-blocks and wherein said shackle is secured to said block by a connecting shank having an upper end secured to said central block.

35. The assembly of claim 33 wherein said sub-blocks are interconnected by at least one substantially horizontally disposed pin.

36. The assembly of claim 25 wherein said block is formed from plastic material.

37. The assembly of claim 25 wherein said block is unitary.

38. The assembly of claim 25 including a plurality of spaced apart wheels rotatably mounted on said block.

39. The assembly of claim 25 including an electronically readable identification tag disposed on said block.

40. A conveyor system for holding and transporting a product to workstations, said conveyor system comprising:
   a) a conveyor; and
   b) a transport/holder assembly mounted on said conveyor for transport along a path, said transport/holder assembly comprising:
      i) a trolley engaging said conveyor for movement therealong;
      ii) an adapter secured to said trolley; and
      iii) a carrier mounted on said adapter and depending therefrom, wherein said carrier and said adapter are relatively arranged and configured such that said carrier may be vertically displaced with respect to said adapter and said trolley;
   c) wherein said carrier includes:
      a block having a lower surface and a footprint defined by a width and a length;
      a shackle having an upper end proximate said block and a lower end distal from said block, said upper end secured to said block such that said shackle depends from said lower surface and said lower end of said shackle is prevented from moving toward said block; and
      a holder formed on said lower end of said shackle, said holder adapted to hold the product.

41. A conveyor system for holding and transporting a product to workstations, said conveyor system comprising:
   a) a conveyor;
   b) a transport/holder assembly mounted on said conveyor for transport along a path, said transport/holder assembly comprising:
      i) a trolley engaging said conveyor for movement therealong;
      ii) an adapter secured to said trolley;
      iii) a carrier mounted on said adapter and depending therefrom, wherein said carrier and said adapter are relatively arranged and configured such that said carrier may be vertically displaced with respect to said adapter and said trolley; and
   c) a weigh station disposed along said conveyor in the path of said transport/holder assembly, said weigh station having a platform and operative to measure weight on said platform, said platform, said conveyor, said trolley and said carrier relatively arranged and configured such that said carrier is raised with respect to said adapter as said carrier passes over said platform.

42. The conveyor system of claim 41 wherein said weigh station includes at least one stabilizer rail operative to limit movement of said carrier transverse to the path of said transport/holder assembly.

43. A conveyor system for holding and transporting a product to workstations, said conveyor system comprising:
   a) a conveyor; and
   b) a transport/holder assembly mounted on said conveyor for transport along a path, said transport/holder assembly comprising:
      i) a trolley engaging said conveyor for movement therealong;
      ii) an adapter secured to said trolley; and
      iii) a carrier mounted on said adapter and depending therefrom, wherein said carrier and said adapter are relatively arranged and configured such that said carrier may be vertically displaced with respect to said adapter and said trolley;
   c) a cutting station disposed along said conveyor in the path of said transport/holder assembly, said cutting station including at least one of an upper guide rail and a lower guide rail operative to limit vertical displacement of said carrier.

44. The conveyor system of claim 43 including both of said upper and lower guide rails.

45. A conveyor system for holding and transporting a product to workstations, said conveyor system comprising:
   a) a conveyor; and
   b) a transport/holder assembly mounted on said conveyor for transport along a path, said transport/holder assembly comprising:
      i) a trolley engaging said conveyor for movement therealong;
      ii) a carrier comprising:
         1) a block having a lower surface and a footprint defined by a width and a length, said block including at least two spaced apart sub-blocks interconnected by at least two substantially horizontally disposed pins, said pins spaced apart a prescribed distance;
         2) a shackle having an upper end proximate said block and a lower end distal from said block, said upper end secured to said block such that said shackle depends from said lower surface and said lower end of said shackle is prevented from moving toward said block; and
         3) a holder formed on said lower end of said shackle, said holder adapted to hold the product;
      iii) an adapter secured to said trolley, said adapter comprising:
         1) an upper, base plate adapted to rigidly engage the trolley; and
         2) a lower plate integral with said base plate and having a lead slot and a trailing slot formed therein, said lead and trailing slots spaced apart from one another a prescribed distance corresponding to said distance between said pins, each of said lead and trailing slots sized and configured to allow vertical movement of said pins relative to said slots when said pins are disposed in respective ones of said lead and trailing slots; and iv) whereby said carrier and said adapter are relatively arranged and configured such that said carrier may be vertically displaced with respect to said adapter and said trolley.

46. The conveyor system of claim 45 including a weigh station disposed along said conveyor in the path of said transport/holder assembly, said weigh station having a platform and operative to measure weight on said platform, said platform, said conveyor, said trolley and said carrier relatively arranged and configured such that said carrier is raised with respect to said adapter as said carrier passes over said platform.

47. The conveyor system of claim 46 wherein said weigh station includes at least one stabilizer rail operative to limit movement of said block transverse to the path of said transport/holder assembly.

48. The conveyor system of claim 45 including a cutting station disposed along said conveyor in the path of said transport/holder assembly, said cutting station including at least one of an upper guide rail and a lower guide rail operative to limit vertical displacement of said block.

49. A transport/holder assembly for holding and transporting a product along a conveyor, said assembly comprising:

a) a trolley engaging the conveyor for movement therealong; and b) a carrier connected with said trolley and depending therefrom, wherein said carrier and said trolley are relatively arranged and configured such that said carrier may be vertically displaced with respect to said trolley;

c) wherein said carrier includes:
a block having a lower surface and a footprint defined by a width and a length;
a shackle having an upper end proximate said block and a lower end distal from said block, said upper end secured to said block such that said s hackle depends from said lower surface and said lower end of said shackle is prevented from moving toward said block; and
a holder formed on said lower end of said shackle, said holder adapted to hold the product.

50. A conveyor system for holding and transporting a product to workstations, said conveyor system comprising:

a) a conveyor;

b) a transport/holder assembly mounted on said conveyor for transport along a path, said transport/holder assembly comprising:
i) a trolley engaging said conveyor for movement therealong; and
ii) a carrier connected with said trolley and depending therefrom, wherein said carrier and said trolley are relatively arranged and configured such that said carrier may be vertically displaced with respect to said trolley; and c) a weigh station disposed along said conveyor in the path of said transport/holder assembly, said weigh station having a platform and operative to measure weight on said platform, said platform, said conveyor, said trolley and said carrier relatively arranged and configured such that said carrier is raised with respect to said trolley as said carrier passes over said platform.

51. The conveyor system of claim 50 wherein said weigh station includes at least one stabilizer rail operative to limit movement of said carrier transverse to the path of said transport/holder assembly.

52. A conveyor system for holding and transporting a product to workstations, said conveyor system comprising:

a) a conveyor;

b) a transport/holder assembly mounted on said conveyor for transport along a path, said transport/holder assembly comprising:
i) a trolley engaging said conveyor for movement therealong;
ii) a carrier connected w ith said trolley and depending therefrom , wherein said carrier and said trolley are relatively arranged and configured such that said carrier may be vertically displaced with respect to said trolley; and c) a cutting station disposed along said conveyor in the path of said transport/holder assembly, said cutting station including at least one of an upper guide rail and a lower guide rail operative to limit vertical displacement of said carrier.

53. The conveyor system of claim 52 including both of said upper and lower guide rails.

* * * * *